United States Patent
Hernandez et al.

(10) Patent No.: US 11,513,479 B1
(45) Date of Patent: Nov. 29, 2022

(54) AUTOMATIC SYSTEM IDENTIFICATION AND CONTROLLER SYNTHESIS FOR EMBEDDED SYSTEMS

(71) Applicant: The Aerospace Corporation, El Segundo, CA (US)

(72) Inventors: Daniel Joseph Hernandez, Long Beach, CA (US); Mitchel John Craun, Henderson, NV (US); Evan Nathan Sperber, Anaheim, CA (US); Richard Yining Chiang, Torrance, CA (US); Nicholas Akira Oune, Irvine, CA (US)

(73) Assignee: THE AEROSPACE CORPORATION, El Segundo, CA (US)

( * ) Notice: Subject to any disclaimer, the term of this patent is extended or adjusted under 35 U.S.C. 154(b) by 0 days.

(21) Appl. No.: 17/409,683

(22) Filed: Aug. 23, 2021

(51) Int. Cl.
*G05B 13/04* (2006.01)
*G05B 23/02* (2006.01)

(52) U.S. Cl.
CPC ......... *G05B 13/045* (2013.01); *G05B 13/048* (2013.01); *G05B 23/0221* (2013.01); *G05B 23/0256* (2013.01); *G05B 23/0294* (2013.01)

(58) Field of Classification Search
None
See application file for complete search history.

(56) References Cited

U.S. PATENT DOCUMENTS

| | | |
|---|---|---|
| 6,278,898 B1 | 8/2001 | Shah |
| 6,487,696 B1 | 11/2002 | Gudmundsson et al. |
| 6,947,876 B1 | 9/2005 | Galarza et al. |

OTHER PUBLICATIONS

Ljung, L., System Identification: Theory for the User, 2nd ed., Prentice Hall, Upper Saddle River, New Jersey, 1999.

*Primary Examiner* — Carlos R Ortiz Rodriguez
(74) *Attorney, Agent, or Firm* — LeonardPatel PC

(57) ABSTRACT

A method for automating system identification includes performing a system identification experiment, and performing a system identifying processing by fitting a model to data from the system identification experiment. The method also includes performing model reduction to generate a model numerically suitable for controller synthesis by removing inconsequential states that cause controller optimization methods to fail. The method further includes performing control synthesis using the generated model or reduced models, including disturbance spectrum estimates, to generate a candidate controller design to be used during system operation. The method also includes checking for controller robustness using the identified model to ensure stability of the system while maximizing closed-loop bandwidth and performance.

32 Claims, 13 Drawing Sheets

300

500

600(a)

600(b)

800

900(a)

900(b)

1300

AUTOMATIC SYSTEM IDENTIFICATION AND CONTROLLER SYNTHESIS FOR EMBEDDED SYSTEMS

FIELD

The present invention relates to automating system identification, and more particularly, to a method of performing system identification and controller synthesis.

BACKGROUND

System identification has not been applied to embedded control systems in mass-produced products because it required an engineer to guide the process. For example, without an expert in the loop, system identification suffers the same drawbacks as adaptive control, i.e., convergence is not guaranteed and it is difficult to know when the model or controller is good enough.

Further, system identification has generally only been used infrequently to check resonant modes on satellites. Specifically, system identification does not fit well within rigorous, risk-averse verification plans for satellites.

Typical techniques compute the best fit for a given model structure given a single or a few collected data sets in a manual process. Existing methods do not combine iterative techniques with good convergence with the ability to compute frequency-dependent model uncertainties to reduce model uncertainty over several iterations. As a result, current state-of-the-art techniques do not perform automated system identification. These techniques also take longer, require human interaction, and are not suitable for deployment in embedded systems.

Systems that rely on artificial intelligence (AI) may work well in specific cases. However, AI has generally not been used to perform control in embedded systems, because the inner workings of AI solutions are extremely difficult to understand, and because it is difficult to guarantee that the AI system is reliable and trustworthy. Further, AI does not have decades of linear system theory to rely on to assure performance and robustness.

Accordingly, a method for performing automatic system identification may be beneficial.

SUMMARY

Certain embodiments of the present invention may provide solutions to the problems and needs in the art that have not yet been fully identified, appreciated, or solved by current system identification technologies. For example, some embodiments of the present invention pertain to performing system identification and controller synthesis.

In an embodiment, a method for automating system identification includes performing a system identification experiment, and performing a system identifying process by fitting a model to data from the system identification experiment. The method also includes performing model reduction to generate a model numerically suitable for controller synthesis by removing inconsequential states that cause controller optimization methods to fail. The method further includes performing control synthesis using the generated model or reduced models, including disturbance spectrum estimates, to generate a candidate controller design to be used during system operation. The method also includes checking for controller robustness using the identified model to ensure stability of the system while maximizing closed-loop bandwidth and performance.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE EMBODIMENTS

Figure 1:
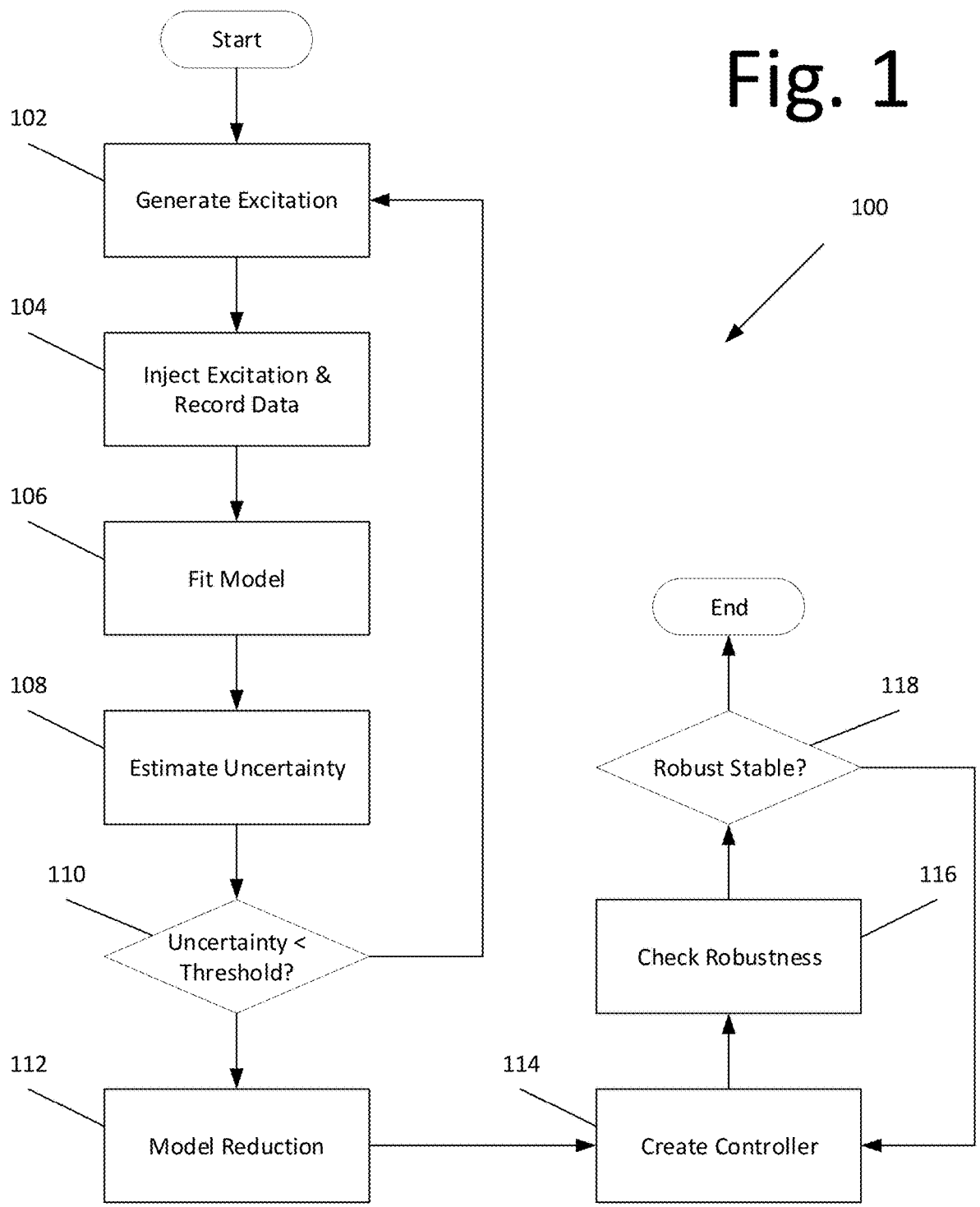
FIG. 1 is a flow diagram illustrating method for automated system identification and controller synthesis, according to an embodiment of the present invention.

Some embodiments pertain to automating processes of performing system identification and controller synthesis. FIG. 1 is a flow diagram illustrating method 100 for automated system identification and controller synthesis, according to an embodiment of the present invention. Method 100 may be segmented in different flows, i.e., a system identification (ID) experiment flow, a system ID processing flow, a model reduction, and a controller synthesis. The key enabler for automating method 100 is the computation of model uncertainties that are used to drive the system identification and the controller design. This will be described in more detail below.

For example, under the system ID experiment flow, an excitation is generated at 102. Initial system ID experiment flow may use additive white noise excitation, since it is assumed that very little information on the plant is known a priori. At 104, the excitation is injected and data is recorded. After the excitation and output data have been recorded, the data may optionally be cleaned if the data acquisition system is not highly reliable. Data cleaning may involve detection of outliers and missing or repeated samples using statistics, equality checks, or prediction errors from prior models, if available. Individual missing samples may be mitigated by inserting interpolated values. Similarly, repeated samples or outliers are mitigated by replacing the aberrant samples with interpolated values. If the data is time stamped and the time between samples is not constant, then the entire data set is interpolated such that the sampling of the cleaned data set is uniform. If portions of the data set are not cleanable, which may happen when there are sequences of several missing or aberrant samples, then the data is segmented into multiple data sets. If the data acquisition system is not highly reliable and there is even one missing or aberrant sample in the data set, then the effect on the accuracy of the identified model can range from minor to major depending on the size of the discontinuity created in the data set.

Under the system ID processing flow, the model is fitted at 106, and at 108, the uncertainty is estimated. For example, since linear system stability is typically checked by computing margins from open-loop frequency responses or structured singular values across a grid of frequencies, the uncertainty in the frequency response of the estimated model can be estimated at these frequencies to facilitate stability analyses.

In an embodiment, the initial model is fitted to the data that is recorded in step 106. The models that explicitly estimate the disturbance spectrum tend to explain the data better, for example. Quality checks that may or may not be specific to the model type may be performed. As an example, some models, which are the residual prediction errors that are unexplained by the model given the input and output data, may be tested for whiteness or correlation with control inputs. The whiteness test may include computing the autocorrelation sequence of the residuals and ensuring that the magnitude of the sequence, other than at the center, which should have a peak value of one, is less than some user-defined threshold. The user-defined threshold may be based on a confidence level. If the whiteness test fails, then it indicates that there is still significant unexplained energy in the output signal. The output signal may be due to the model order being too small or due to the model structure being inappropriate.

Similarly, the input correlation test includes computing the cross-correlation sequence of the residuals and the control inputs, and ensuring that the magnitude of the sequence is less than some user-defined threshold. This user-defined threshold may be based on a confidence level. If the input correlation test fails, then it indicates that there is feedback in the residuals, which can again be due to the model order being too small or the model structure being inappropriate. This test is more likely to fail, especially for identification methods not based on prediction error methods, for closed-loop system identification where a feedback controller is already in use to regulate the system during the identification experiment. These residual analyses may be performed for general model structures and may be easily performed by someone skilled in the arts of probability and statistics.

In some embodiments, estimated frequency-dependent uncertainties are used to evaluate the model quality, as described below and in greater detail in the section on COVARIANCE ESTIMATION. Such model quality tests, while much more useful from a controller design and analysis perspective than the more generic residual tests, are computationally more complex and use formulas that are specific to the model structure. However, the residual tests may first be used to ensure confidence that the estimates of the frequency-dependent uncertainties have converged.

The estimated disturbance spectrum is computed from the estimated disturbance model, which is generated from the generated fit model. For example, when the square of the magnitude frequency response of the estimated dynamic model from unknown disturbance inputs to measurable outputs is computed and scaled by the estimated variance of the unknown disturbance input (e.g., e(k) in FIG. 2, Equations (1), (2), and others), that is the estimated disturbance spectrum.

In some embodiments, uncertainty is defined as frequency-dependent uncertainty. The use of a frequency-dependent relative uncertainty, which is defined as the ratio of the frequency-dependent uncertainty to the magnitude of the frequency response of the model, is particularly useful for automating the system ID process. First, frequency-dependent relative uncertainty does not require a priori knowledge of the plant to establish a reasonable threshold for stopping the process. Second, frequency-dependent relative uncertainty improves determination of frequency bands in which uncertainty should be reduced. For example, many dynamic systems have integrated dynamical states that cause the magnitude of the frequency response to be very large at low frequencies. By very large, it may be assumed that the magnitude of the frequency response becomes unbounded as the input frequency approaches zero.

However, accuracy of the low-frequency response is much less important than the frequency response near the first resonant modes of the system. This is because those models tend to limit the closed-loop bandwidth, and therefore, the performance of the system. Using the frequency-dependent relative uncertainty de-weights these large low-frequency responses. Applying a frequency-dependent weighting function can further improve determination of frequency bands in which uncertainty should be reduced. For example, a band-pass weighting function can further de-weight large low-frequency magnitude responses while also de-weighting noisy response estimates near the Nyquist frequency. The Nyquist frequency is the maximum observable frequency and is well beyond practical controller bandwidths. Estimating of the uncertainty may allow for determining where the excitation is to be inserted along the frequency band of interest to reduce the uncertainty in the model. In other words, the estimation of the uncertainty allows for the model to be improved.

Returning to FIG. 1, at 110, the uncertainty is compared to the threshold, which may be predefined. In some embodiments, threshold is a constant value against which the weighted relative frequency-dependent uncertainty is compared. If the frequency-dependent uncertainty of interest is below this threshold across all frequencies under consideration, then the comparison evaluates as true and the uncertainties are deemed sufficiently small. A threshold in the range of 0.1-0.01, meaning that the weighted relative frequency-dependent uncertainty should be 10 to 100 times smaller than the estimated magnitude frequency response of the system, may be appropriate for most systems. Once the uncertainties are sufficiently small, model reduction may be performed on the model to improve numerical stability during controller synthesis, i.e., method 100 continues to model reduction flow at 112.

If, however, the uncertainties are not sufficiently small, then the frequency ranges with large uncertainties are determined and another system identification experiment is performed with energy only in those ranges. See step 102. This process may be repeated until the uncertainties are sufficiently small across all frequencies of interest. While the model structure and estimation method are not specified, it is assumed that the system identification technique used supports computation of frequency response uncertainties and refinement of the model with additional data. It is further assumed that the system can be accurately modeled as a linear system and that the estimation method has global convergence. If the estimation method tends to find local minima, then collecting more data may not lead to refinement of results.

Method 100 continues to model reduction step at 112. In some embodiments, in order to limit excitation signal energy to a desired frequency range, a chirp signal is generated. This approach also facilitates avoiding known system non-linearities such as friction by avoiding dwells near zero velocities and actuator limitations by scaling the amplitude as a function of frequency.

Once the system identification iterations are complete, the estimated plant and disturbance model and the frequency-dependent plant and disturbance model uncertainties can be used for automated controller synthesis and stability analysis.

In an embodiment, model reduction is performed by casting the identified (or generated) model into a controller or observer canonical state-space form, in which the coefficients of the model are directly used as elements in select rows or columns of the state-space model matrices, and then performing model reduction on the state-space model. Model reduction may then be applied prior to any use or transformation of the canonical state-space model as it is a numerically fragile form. Model reduction techniques, such as balanced model reduction using Hankel singular values or Hankel minimal degree approximation without balancing, may be systematic and robust.

The generated model is a parametric dynamic model derived from (1) measurable inputs to measurable outputs and (2) unknown disturbance inputs to measurable outputs. The generated model is also a discrete-time transfer function or matrix of discrete-time transfer functions or an equivalent state space model where the orders of the transfer function numerator and denominator polynomials or the number of states are specified prior to estimating the parameters of the model.

The generated model is also a locally or globally optimal solution to the system identification problem of minimizing the energy (i.e., the mean square error) of the prediction errors given a set of measured input data, measured output data, and a specified model structure. The generated model further includes estimated covariances of the estimated parameters of the model that are subsequently used to compute uncertainties of estimated frequency responses of the model. These estimated frequency response uncertainties are key enablers for automating the automated system identification and control synthesis and validation processes.

Like the generated model, the reduced model is a parametric dynamic model from (1) measurable inputs to measurable outputs and (2) unknown disturbance inputs to measurable outputs. Also, like the generated model, the reduced model is a discrete-time transfer function or matrix of discrete-time transfer functions or an equivalent state space model, where the orders of the transfer function numerator and denominator polynomials or the number of states are specified prior to estimating the parameters of the model.

However, unlike the generated model, the reduced model is a smaller (in terms of transfer function polynomial orders or number of state space model states) model with larger prediction errors than the generated model. The reduced model is also more suitable for controller synthesis since inconsequential modes that cause numerical problems have been removed. Further, since model reduction does not require reprocessing the data collected during the system identification experiments, then model reduction is computationally much less expensive. Furthermore, the number of reduced model sizes is finite and the errors between the generated and reduced models are known, so it is straightforward to compute reduced models for a set of reduced model sizes and pick the one with the smallest errors. Note that the frequency-dependent model reduction errors can then be added to the frequency-dependent uncertainties if the uncertainties are used in the controller design process. However, the original frequency-dependent uncertainties from the original, higher-order model can be used when assessing controller robustness.

Under the control synthesis flow, method 100 continues to step 114 to create a controller. For instance, at 114, controller creation is performed, and at 116, a robustness check is performed. Many controller creation techniques from the literature are available, though the more automatable techniques tend to be from the theory of optimal control of state-space systems. The choice of the method depends upon the desired performance metrics and the processing constraints of the embedded system. At the low end of the computational complexity spectrum, an auto-tuned proportional-integral-derivative (PID) controller may be created. However, the auto-tuned PID controller is far from optimal for systems with significant resonant modes or frequency-dependent disturbance spectra. If it is desired to minimize the power of the error in the signal being controlled, then a frequency-shaped linear quadratic Gaussian (LQG) controller can be synthesized. If it is instead desired to minimize the worst-case response, where it is assumed that all of the disturbance signal power can be concentrated at a single frequency, then an H-infinity controller can be synthesized.

In addition to the different optimality criteria for LQG versus H-infinity controllers, there are computational trades as well. The LQG controller may likely require multiple iterations of checking the controller robustness and resynthesizing the controller to reduce the bandwidth by adjusting the frequency-shaped weighting function until robustness is achieved. The H-infinity control synthesis is more likely to produce a robust controller on the first attempt, though the controller synthesis process itself may internally use an iterative process. Alternatively, and more towards the higher end of the computational complexity spectrum, model predictive control (MPC) controller synthesis may be used. This method may be used to simultaneously generate a nearly optimal trajectory to follow that is nearly optimal trajectory over a specified prediction horizon while also performing optimal feedback control to follow the trajectory. The approach is particularly useful when there are actuator or sensor saturation levels that must be avoided. However, it is computationally too complex for many embedded systems.

It should be noted that, for LQG and H-infinity, the computational burden is during design time. For example, the computational burden at run-time is proportional to the number of model states, but is the same for LQG and H-infinity and will only differ if, for a given model size, different frequency-dependent weightings are used. For MPC, on the other hand, there is a higher computational burden at run-time. For purposes of explanation, the MPC has a higher computational burden since the MPC is repeatedly solving an optimization problem at run-time.

At 118, the system checks if the robustness is stable. If not, the method returns to step 114; otherwise, the method is complete. In an alternative embodiment, the method returns to step 102 to begin the system ID experiment process again.

The first stability check that is performed is to ensure that the closed-loop system model is stable when the generated controller is applied to the identified model. This stability check is performed by computing the eigenvalues of the closed-loop system model and ensuring that they all have magnitudes less than one.

However, the identified model is uncertain, and this needs to be accounted for in the stability analysis. Additionally, while it is preferred that the identified model is used in the stability analysis, if a reduced model is used instead, then model reduction error should be accounted for as well. In those embodiments, the uncertainty and model reduction error is incorporated as additive complex unstructured uncertainties in a robust stability analysis based on mu-analysis theory. For single-input, single-output (SISO) models, a 3-sigma value at each frequency is used for the additive uncertainty bound by multiplying three times the sum of the square-root of the magnitude of the estimated model covariance and the model reduction error. Generally speaking, for multiple-input, multiple-output (MIMO) systems, bounds on the size of the additive unstructured uncertainty due to model uncertainty is on estimating the maximum singular value of possible perturbation matrices that have been scaled by three times the square-root of the estimated model covariance matrix.

Once bounds on the additive complex unstructured uncertainty have been computed from the model uncertainty, then the robust stability of the system may be checked using mu-analysis. In mu-analysis, the maximum singular value of the perturbed closed-loop system is checked at each frequency in a dense grid of frequencies. If the maximum singular values are less than one at each frequency, then the infinity-norm of the system is less than one, which is equivalent to saying that that gain of the closed-loop system is less than one across all frequencies, and thus, the system is stable. The perturbations considered are based on the additive complex unstructured uncertainty where, at each frequency, complex numbers (or matrices of complex numbers for MIMO systems) of unit magnitude and random phase are scaled by the additive complex unstructured uncertainty bounds. For each possible perturbation considered, the inputs to the perturbation are the same as the inputs to the model and the outputs from the perturbation are summed with the outputs of the model, creating a new possible perturbed system. The maximum singular value at each frequency is then obtained from the set of maximum singular values for the perturbed models considered. This process, which can be applied to any pairing of a linear, time-invariant (LTI) controller design and an uncertain LTI model, is known to one skilled in the art of modern robust control theory.

If robust stability of the system cannot be ensured, then performance goals can iteratively be reduced until robust stability is ensured. Performance goals can vary. For example, the performance goal could be a closed-loop bandwidth, a step response time, a settling time, the root-mean-square (RMS) steady-state tracking error, or a weighted combination of these goals or others. In general, minimizing the RMS steady-state error, which is the energy of the error signal, is a good performance goal since the minimization usually implies the maximization of the system bandwidth, and hence, good response times as well. Ensuring robust stability while minimizing the energy of the error signal tends to reduce settling times as well. The adjustment of the performance goals, in general, depends upon the controller synthesis method. For example, when PID controller gains are computed for the model, then the gains are computed directly from the desired bandwidth. When an LQG controller is being synthesized, then the bandwidth and the trade-off between error and controller output signal energies are indirectly affected by adjusting frequency-dependent weighting functions. For example, if there is a low-pass frequency-dependent weighting function applied to the error signal, then the corner frequency of the low-pass filter could be shifted lower. Thus, the frequency-weighted LQG controller, which presumably uses the estimated disturbance spectrum to minimize the error energy, only attempts to compensate for disturbances at lower frequencies and does not require a high bandwidth.

System Identification

Model Estimation Algorithm

Figure 2:
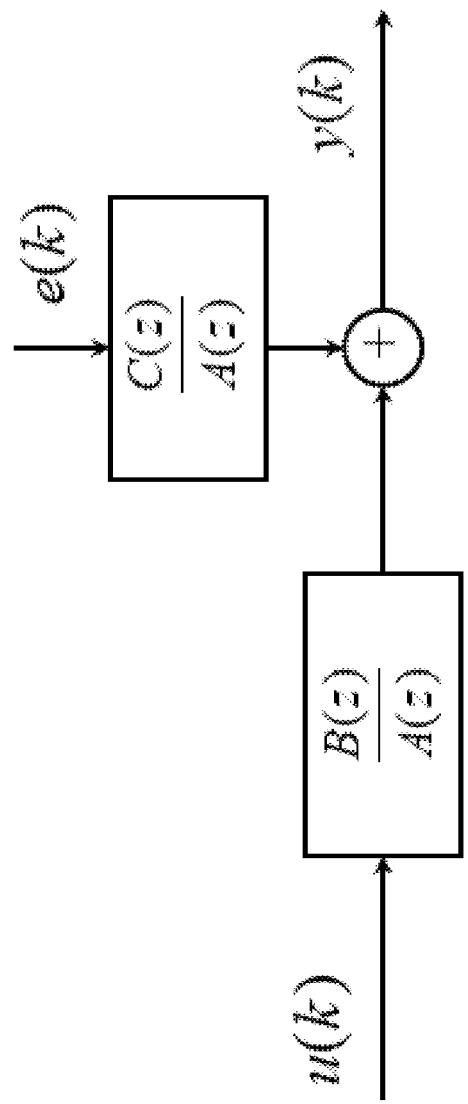
FIG. 2 is a transfer function block diagram illustrating ARMAX plant and disturbance model, according to an embodiment of the present invention.

The autoregressive moving average with external input (ARMAX) model was chosen in this embodiment, as the model structure allows for direct estimation of the plant and disturbance model parameters. In the ARMAX formulation, both the plant and disturbance processes are modeled as discrete time transfer functions as shown in FIG. 2. FIG. 2 is a transfer function block diagram illustrating ARMAX plant and disturbance model 200, according to an embodiment of the present invention.

Given a sequence of experimentally collected input data u(k) up through time index k and output data y(k) up through time index k-1, the estimate of the output y(k) is given by the following formula:

$$\hat{y}(k) = -a_1 y(k-1) - \ldots - a_{n_a} y(k-n_a) + b_1 u(k) + \ldots + \\ b_{n_b} u(k - n_b + 1) + c_1 e(k-1) + \ldots + c_{n_c} e(k - n_c)$$ Equation (1)

where the prediction error e(k) is defined as follows $$e(k) \equiv y(k) - \hat{y}(k)$$ Equation (2)

The a's, b's, and c's are the coefficients of the associated discrete time transfer function and are the parameter set that must be searched over to find the best fit for the collected data. For notation compactness, parameter set $\theta$ is defined as follows, $$\theta = [a_1 \ldots a_{n_a} b_1 \ldots b_{n_b} c_1 \ldots c_{n_c}]$$ Equation (3)

For a given choice of $\theta$, the quality of the fit is determined by the mean-squared prediction error at each time step.

$$V(\theta) = \frac{1}{N} \sum_{k=1}^{N} (y(k) - \hat{y}(k, \theta))^2$$ Equation (4)

where N is the number of data points collected. The problem has thus been formulated as an optimization problem with the above performance objective. The optimal model parameters $$\theta^* = \arg\min_\theta V(\theta) \qquad \text{Equation (5)}$$

can then be readily determined using an optimization software package. To assist in convergence, both the gradient and Hessian of the performance objective can be formulated. The gradient of the objective is $$V' = \frac{\partial V}{\partial \theta} = \frac{-2}{N}\sum_{k=1}^{N} e(k,\theta)\hat{y}'(k,\theta) \qquad \text{Equation (6)}$$

where the gradient of the estimate $Y^\wedge(k,\theta)$ is a row vector given by the following recursive relation.

$$\hat{y}'(k,\theta) = [-y(k-1), \ldots, -y(k-n_a), u(k), \ldots,$$
$$u(k-n_b+1), e(k-1,\theta), \ldots, e(k-n_c,\theta)] - C \cdot M \qquad \text{Equation (7)}$$

where $$C \equiv \begin{bmatrix} c_1 c_2 \ldots c_{n_c} \end{bmatrix} \text{ and } M \equiv \begin{bmatrix} \hat{y}'(k-1,\theta) \\ \vdots \\ \hat{y}'(k-n_c,\theta) \end{bmatrix} \qquad \text{Equation (8)}$$

The gradient can thus be calculated iteratively with M initialized to zero if it is assumed that the first $n_c$ estimates $y^\wedge(1,\theta) \ldots \hat{y}(n_c,\theta)$ are equal to the first $n_c$ measurements $y(1) \ldots y(n_c)$, making them no longer dependent on $\theta$.

The Hessian of the objective can likewise be shown to be $$V'' = \frac{2}{N}\sum_{k=1}^{N} \hat{y}'(k,\theta)^T \hat{y}'(k,\theta) - e(k,\theta)\hat{y}''(k,\theta) \qquad \text{Equation (9)}$$

where the Hessian of the estimate $y^{\wedge\prime\prime}(k,\theta)$ is again given by a recursive relation $$\hat{y}''(k,\theta) = -M_a - M_a^T - (I_{n_T} \otimes C)P_\pi W \qquad \text{Equation (10)}$$

where $\otimes$ is the Kronecker product, $n_T \equiv n_a + n_b + n_c$, $$M_a \equiv \begin{bmatrix} 0_{(n_a+n_b) \times n_T} \\ M \end{bmatrix}, W \equiv \begin{bmatrix} \hat{y}''(k-1,\theta) \\ \vdots \\ \hat{y}''(k-n_c,\theta) \end{bmatrix} \qquad \text{Equation (11)}$$

and the rows of the permutation matrix $P_\pi$ are defined by the permutation $$:\pi \equiv \begin{pmatrix} 1 & 2 & \ldots & i & \ldots & n_T n_c \\ 1 & n_T+1 & \ldots & j & \ldots & n_T n_c \end{pmatrix} \qquad \text{Equation (12)}$$

where $$i = (r-1)n_c + s$$
$$j = (s-1)n_T + r \text{ for } r \in \{1, \ldots, n_T\} \text{ and } s \in \{1, \ldots, n_c\}.$$

The Hessian of the objective can thus be calculated iteratively where the first $n_c$ values of $y^{\wedge\prime\prime}(k,\theta)$ can also be initialized to zero if we assume that the first $n_c$ estimates are equal to the first $n_c$ measurements.

The gradient and Hessian can then be used to calculate the optimal model parameters using, for example, the Gauss-Newton algorithm or the trust-region algorithm used by the 'fminunc' MATLAB routine. Depending on the embodiment, more computationally efficient algorithms for computing the Hessian can be derived for embedded applications.

Covariance Estimation

As described above, the model uncertainty, in the form of the covariance of the plant model, should be estimated for determination of the frequency range of the next experiment. Further, the model uncertainty should also be estimated when the algorithm has converged and is terminated. In an embodiment, $G(e^{i\omega})$ and $H(e^{i\omega})$ represent the frequency responses of the estimated plant and disturbance models, respectively. From this, it can be shown via Gauss' approximation formula that, given a parameter estimate $\theta^\wedge$, the covariance for the ARMAX formulation of the plant and disturbance models is approximated as follows.

$$\text{cov}\begin{bmatrix} \hat{G}(e^{i\omega}) \\ \hat{H}(e^{i\omega}) \end{bmatrix} = \frac{1}{N}(\hat{T}'(e^{i\omega},\hat{\theta}))^T \hat{P}_\theta \hat{T}'(e^{-i\omega},\hat{\theta}) \qquad \text{Equation (13)}$$

where $$\hat{P}_\theta \equiv \frac{\hat{\lambda}}{N}[\Phi^T \Phi]^{-1} \text{ and } \hat{\lambda} \equiv \frac{1}{N}\sum_{k=1}^{N} e^2(k,\hat{\theta}) \qquad \text{Equation (14)}$$

with $$\Phi \equiv \begin{bmatrix} \hat{y}'(1,\hat{\theta}) \\ \vdots \\ \hat{y}'(N,\hat{\theta}) \end{bmatrix} \qquad \text{Equation (15)}$$

where $y^\wedge(k,\theta)$ was defined in the previous subsection, and finally the $n_T$-by-2 matrix $T'(e^{i\omega},\theta^\wedge)$ is defined as $$\hat{T}'(e^{i\omega},\hat{\theta}) \equiv \begin{bmatrix} \begin{bmatrix} e^{-i\omega} \\ \vdots \\ e^{-in_a\omega} \end{bmatrix} & \begin{bmatrix} \frac{-\hat{B}(e^{i\omega})}{\hat{A}^2(e^{i\omega})} & \frac{-\hat{C}(e^{i\omega})}{\hat{A}^2(e^{i\omega})} \end{bmatrix} \\ \begin{bmatrix} 1 \\ \vdots \\ e^{-1(n_b-1)\omega} \end{bmatrix} & \begin{bmatrix} \frac{1}{\hat{A}(e^{i\omega})} & 0 \end{bmatrix} \\ \begin{bmatrix} e^{-i\omega} \\ \vdots \\ e^{-in_c\omega} \end{bmatrix} & \begin{bmatrix} 0 & \frac{1}{\hat{A}(e^{i\omega})} \end{bmatrix} \end{bmatrix} \qquad \text{Equation (16)}$$

For a single-input, single-output (SISO) system, the result is thus a two-by-two matrix whose diagonal elements are the covariances of the plant and disturbance models respectively, and the off diagonal elements are their cross-covariances.

In some embodiments, estimated frequency-dependent relative uncertainty, defined as $$R(\omega) \equiv \frac{\sqrt{\text{cov}\hat{G}(e^{i\omega})}}{|\hat{G}(e^{i\omega})|} \quad \text{Equation (17)}$$

is used to determine when the model is of good enough quality for controller design and validation. That is, for some user-defined threshold $\rho$, when $R < \rho$ for all $\omega$, then the model is considered good. A typical value for $\rho$ may be in the range of 0.1 to 0.01. Since uncertainties tend to scale with the magnitude of the estimated frequency response, then the uncertainty ratio tends to be large at resonant frequencies that are important for controller design and validation. However, for systems with pure integral states, such as for free dynamical systems, or with low stiffnesses, the uncertainties also tend to be large at low frequencies where the system response is large. Hence, it can be advantageous to apply a frequency weighting to the relative uncertainty. The weighted frequency-dependent relative uncertainty can be defined as $$R_w(\omega) \equiv |W(e^{i\omega})| R(\omega) \quad \text{Equation (18)}$$

where $W(e^{i\omega})$ is a user-defined frequency response. This frequency response may be from, for example, a band-pass filter such that model uncertainty at both low and high frequencies are deweighted. It may be useful to deweight model uncertainty at low frequencies where feedback is large and model uncertainty is unimportant. It may also be useful to deweight model uncertainty at high frequencies that are either well beyond the target closed-loop bandwidth or close to the Nyquist frequency, since the system response tends to be attenuated at high frequencies, and therefore, the model uncertainty is again unimportant. The weighted frequency-dependent relative uncertainty may then be compared to some user-defined threshold, $\rho_W$, and when $R_W < \rho_W$ for all $\omega$, then the model can be considered good. Again, a typical value for $\rho_W$ may be in the range of 0.1 to 0.01. In some embodiments, the magnitude of the estimated model frequency response,$|\hat{G}(e^{i\omega})|$, may be replaced with a modified magnitude frequency response. The modified magnitude frequency response tracks the estimated magnitude frequency response everywhere except for at the anti-resonances, where a smooth approximation to the estimated magnitude frequency response, sometimes referred to as the backbone of the magnitude frequency response, is followed instead. This may be done to reduce peaking in the uncertainty ratio or relative uncertainty ratio at frequencies of anti-resonances, which are of less interest when designing and validating controllers. The modified magnitude frequency response may be computed by applying a smoothing filter to the magnitude of the estimated frequency response and then combining the smoothed magnitude frequency response with the magnitude of the estimated frequency response. The combination of the smoothed and estimated magnitude frequency responses may be computed as the maximum value at each frequency or as a weighted sum of the two values at each frequency.

If the model is not considered good, then the system identification process continues using the frequency-dependent uncertainty or relative uncertainty to determine the frequency range of the spectral content of the excitation signal. In the certain embodiments, the frequency of the peak relative uncertainty is used as the center frequency of the spectral content of the excitation such that the peak uncertainty is reduced with each iteration. The bandwidth of spectral content of the excitation may be a user-defined scale factor. For example, the minimum frequency of the spectral content may be an octave lower than the center frequency while the maximum frequency may be an octave higher. Alternatively, the bandwidth of the excitation may be computed as proportional to the Q factor of the identified resonance nearest the peak uncertainty. The Q factor is a commonly used measure for the sharpness of a resonant peak in a frequency response, whether computed as the estimated full width at half maximum (FWHM) value or from the estimated damping ratio. In another embodiment, the minimum and maximum frequencies of the spectral content of the excitation can be set to the minimum and maximum frequencies at which the uncertainty or relative uncertainty threshold is exceeded. The band-limited excitation for the next system identification experiment is generated from the minimum and maximum frequencies of the excitation spectral content. In an embodiment, the excitation is generated as a chirp, or swept-sine, signal with the start and stop frequencies set to the minimum and maximum frequencies of the excitation spectral content. Such a signal may be scaled as a function of frequency to avoid saturating actuator or sensor signals by multiplying the signal by the ratio of the saturation limit to the magnitude of the estimated frequency response at the instantaneous frequency of the chirp signal.

The system identification process may terminate after performing a user-specified number of system identification experiments. Thus, if reducing the uncertainty, uncertainty ratio, or weighted uncertainty ratio below the user-specified threshold is not achievable, then the entire process either terminates or proceeds to controller synthesis based upon user preferences.

Note that the above SISO techniques may be extended to multiple-input, multiple-output (MIMO) systems through the use of matrix fraction descriptions in which the coefficients of the discrete time transfer functions in the model (the a's, b's, and c's) are replaced by matrices (A's, B's, and C's). The model structure in Equation (1) then becomes $$\hat{y}(k) = -A_1 y(k-1) - \ldots - A_{n_a} y(k - n_a) + B_1 u(k) + \ldots + \quad \text{Equation (19)}$$
$$B_{n_b} u(k - n_b + 1) + C_1 e(k-1) + \ldots + C_{n_c} e(k - n_c)$$

where $A_m$ is $n_y$-by-$n_y$, $B_n$ is $n_y$-by-$n_u$, $C_p$ is $n_y$-by-$n_y$, $n_u$ is defined as the number of inputs of the system and $n_y$ is defined as the number of outputs of the system for m from 1 and $n_a$, n from 1 to $n_b$, and p from 1 to $n_c$. The estimation of the model parameters and the model uncertainty are performed using the same techniques as described above, though managing the additional indices and increased dimensionality increases the complexity.

Modeling and Simulation

Figure 3:
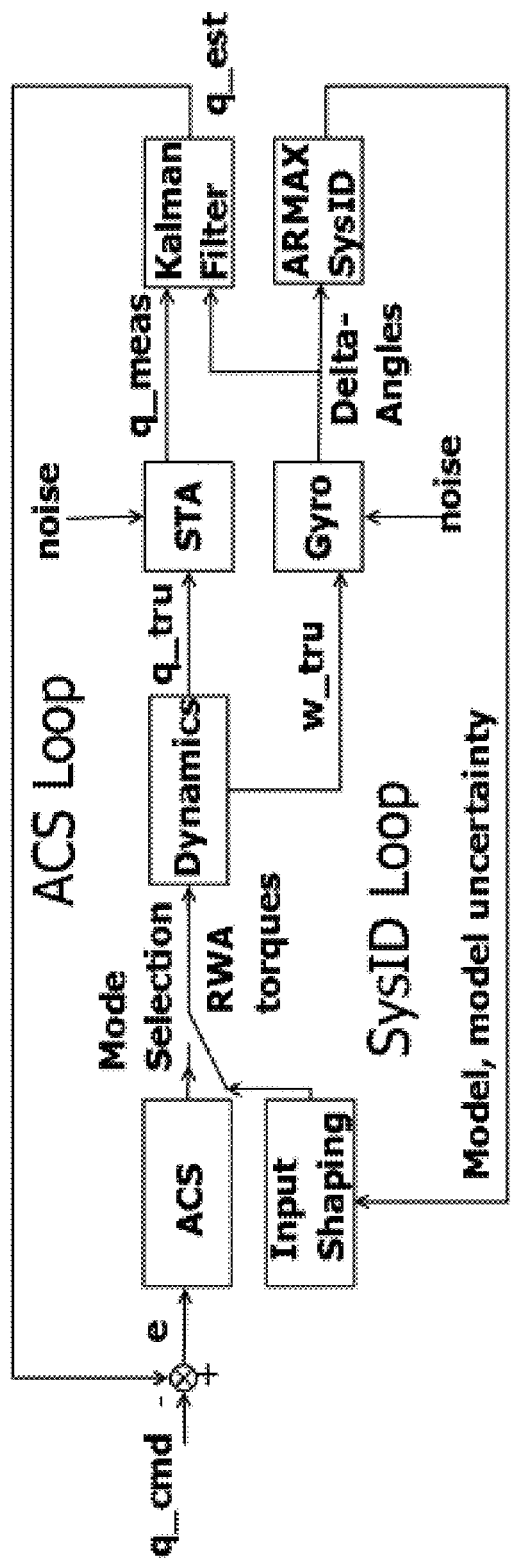
FIG. 3 is a block diagram model illustrating a closed-loop attitude control system with system identification, according to an embodiment of the present invention.

Certain embodiments, such as the detailed time domain simulation, were developed using MATLAB Simulink for testing the behavior of the closed-loop system identification algorithm in a flight-like environment. See, for example, FIG. 3, which is a block diagram illustrating a closed-loop attitude control system 300 with a system identification, according to an embodiment of the present invention. This is important since it permits analysis of algorithm sensitivity to uncertain system characteristics such as sensor noise, physical geometry, and mass properties. A simulation also assists in design trades such as determining minimum reaction wheel sizes and torque limits.

Space Vehicle Dynamics

Figure 4:
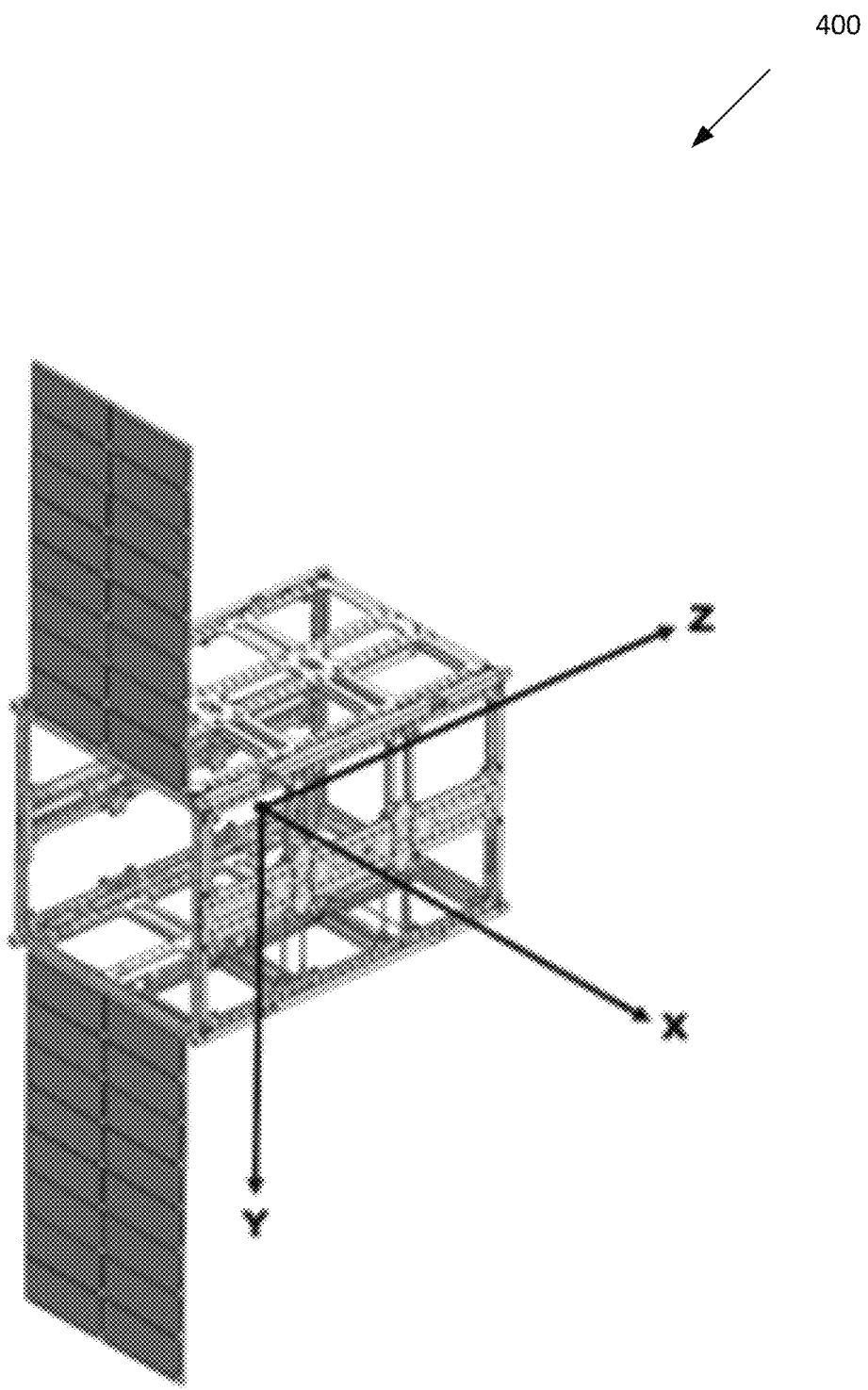
FIG. 4 is a diagram illustrating a satellite bus model, according to an embodiment of the present invention.

The space vehicle is modeled as a multibody system with component rigid bodies connected at rigid interfaces or over stiff hinges. A demonstration platform is envisaged as a CubeSat-class mission and so the bus is sized using representative 12U mass properties. See, for example, FIG. 4, which is a diagram illustrating a bus model 400, according to an embodiment of the present invention. Deployed solar panels are modeled may be uniform thin plates with "flex modes" approximated by applying torsional stiffness and damping at the interfaces. Since the first bending mode of the wing is expected to dominate, the attitude motion of the vehicle about the x-axis of the body frame may be focused on.

Figure 5:
FIG. 5 is a graph illustrating a frequency response of a linearized dynamic reference model, according to an embodiment of the present invention.
Figure 5:
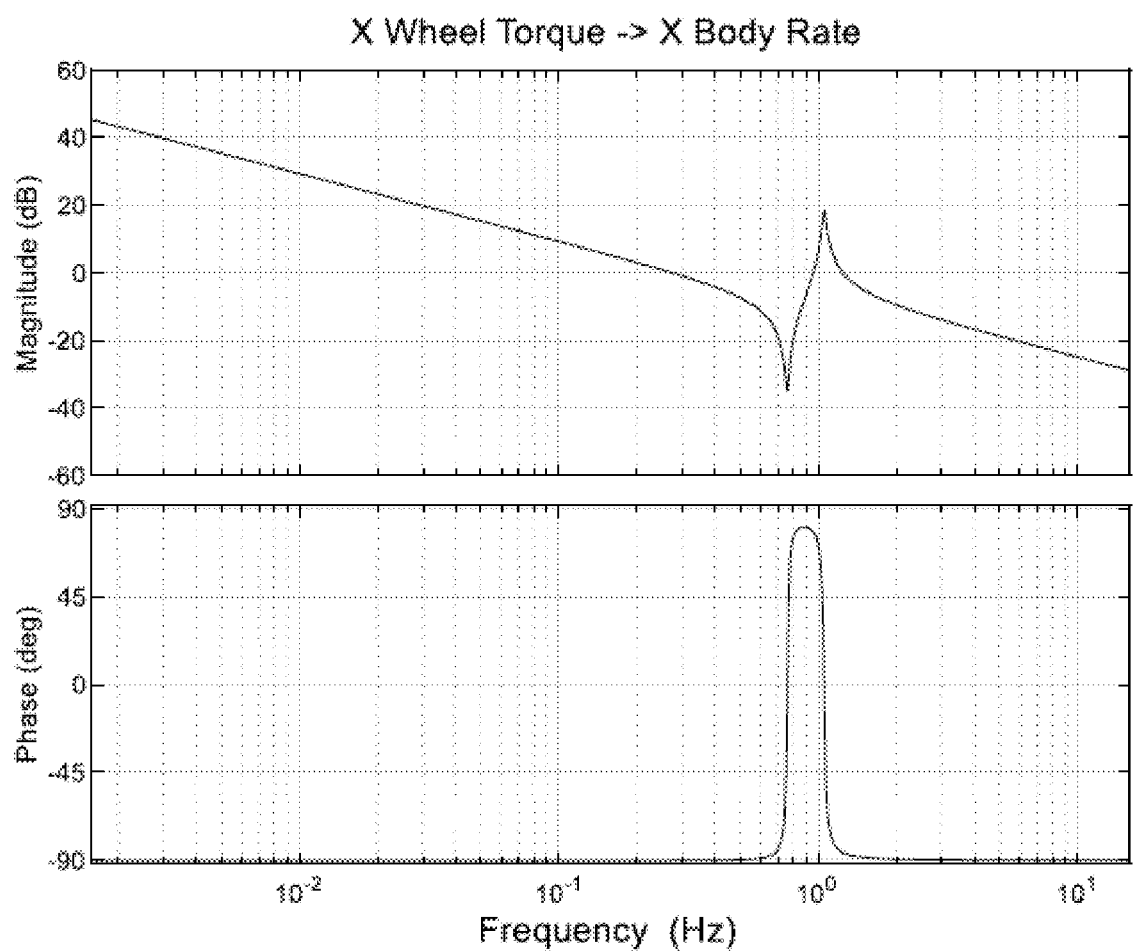

The bus model may also contain three rigid single degree-of-freedom reaction wheels, one aligned with each body axis, to which attitude control torques can be applied in an equal and opposite sense relative to the bus mass. The nonlinear equations of motion are derived using Kane's method facilitated by MotionGenesis™. The equations of motion are extracted from the MotionGenesis™ simulation file and inserted into a Simulink Level 2 S-Function. FIG. 5 is a graph 500 illustrating a frequency response of a linearized dynamic reference model from input torque about the x-axis to angular velocity about the x-axis, according to an embodiment of the present invention. The linearized dynamics shown in graph 500 are computed using MATLAB's linmod and are included as a "truth" reference for the system identification algorithm.

Attitude Determination

The spacecraft attitude control system (ACS) loop relies on both star tracker and gyro models providing input into a six state Kalman filter for estimating attitude. The system identification algorithms do not depend on the star tracker, so a low-fidelity model that simply adds noise to the truth attitude quaternions is used. The gyro outputs delta-angles, which are inputs to the system identification routines. Thus, special care is taken to ensure that the gyro model used in the simulation is high fidelity and includes realistic values for noise terms. To confirm the fidelity of the gyro model, laboratory gyro data was compared to simulated gyro data using an Allan Variance analysis to ensure a quality fit. The gyro being modeled may be a commercial-off-the-shelf unit in some embodiments.

System ID Loop

Figure 11:
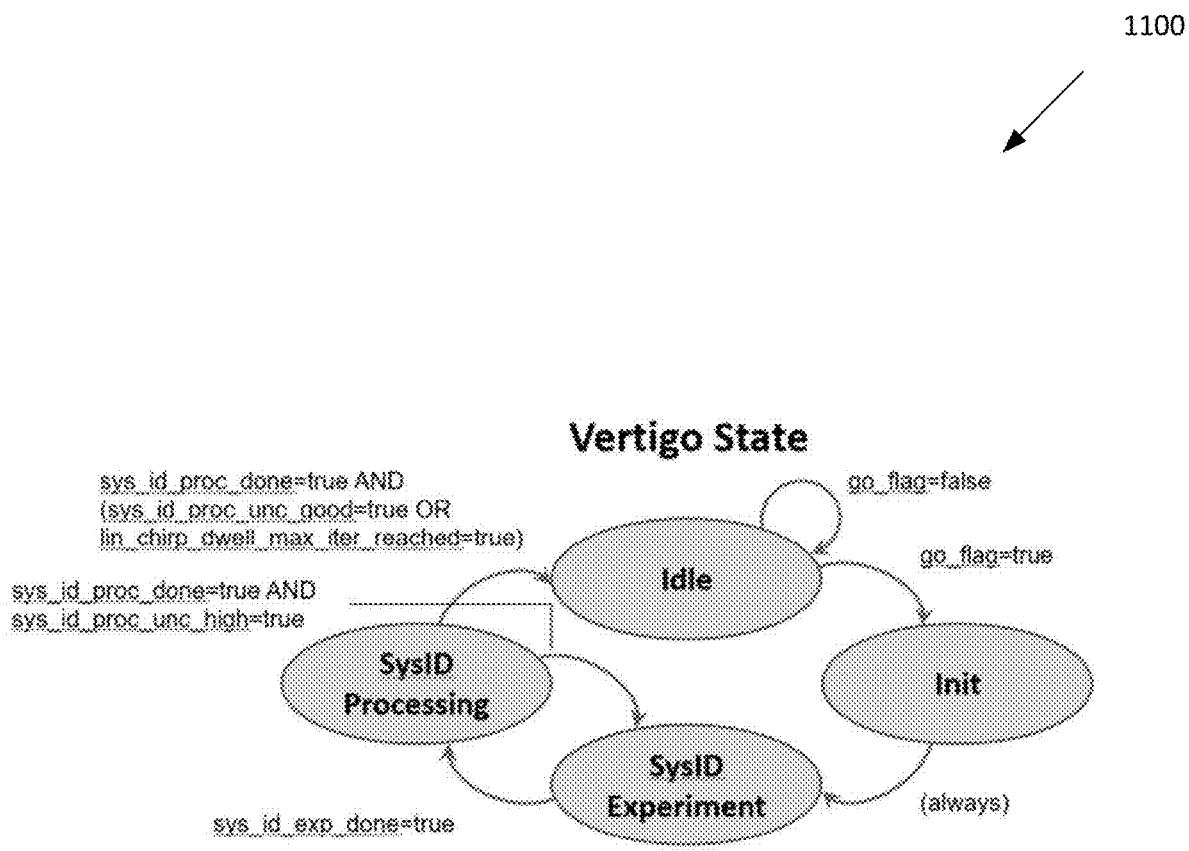
FIG. 11 is a diagram illustrating a vertigo state, according to an embodiment of the present invention.
Figure 12:
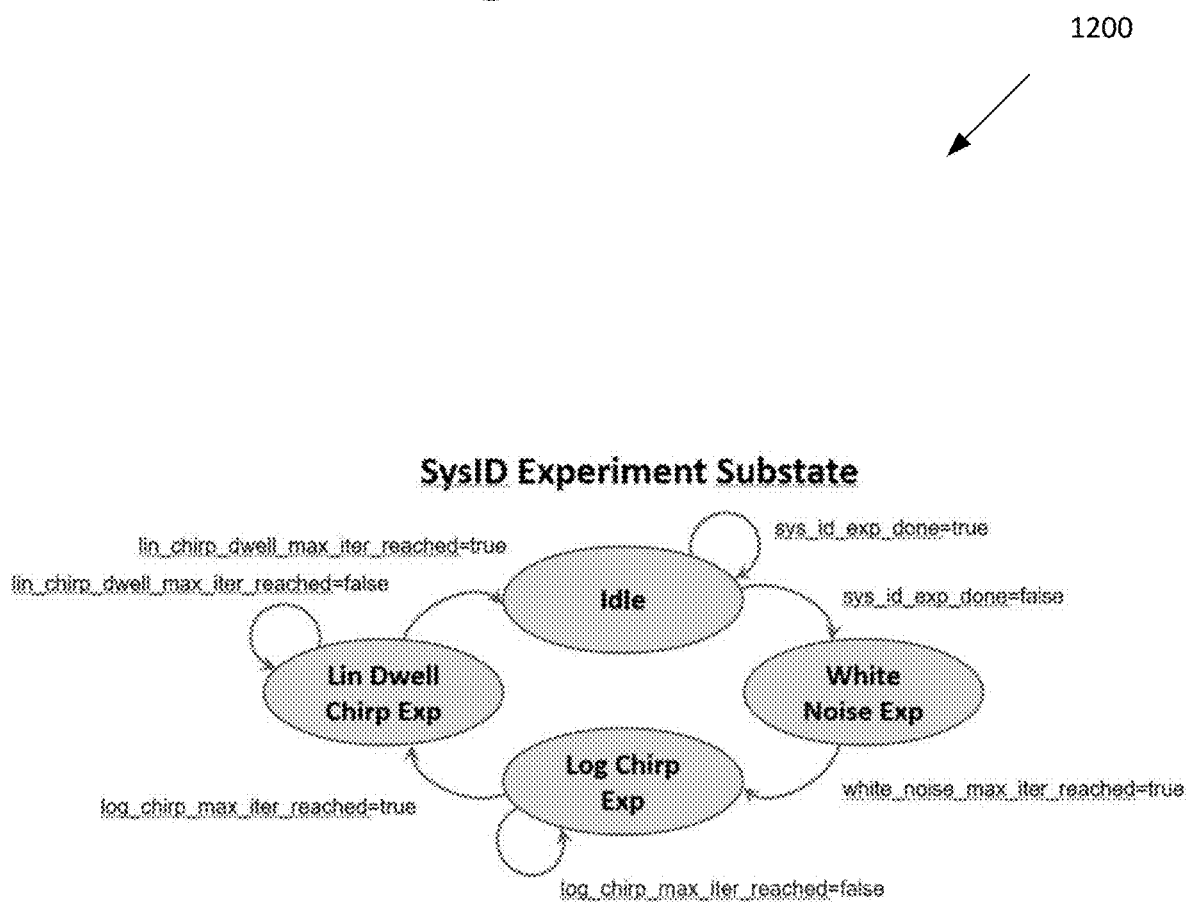
FIG. 12 is a diagram illustrate illustrating a system identification experiment substate, according to an embodiment of the present invention.
Figure 13:
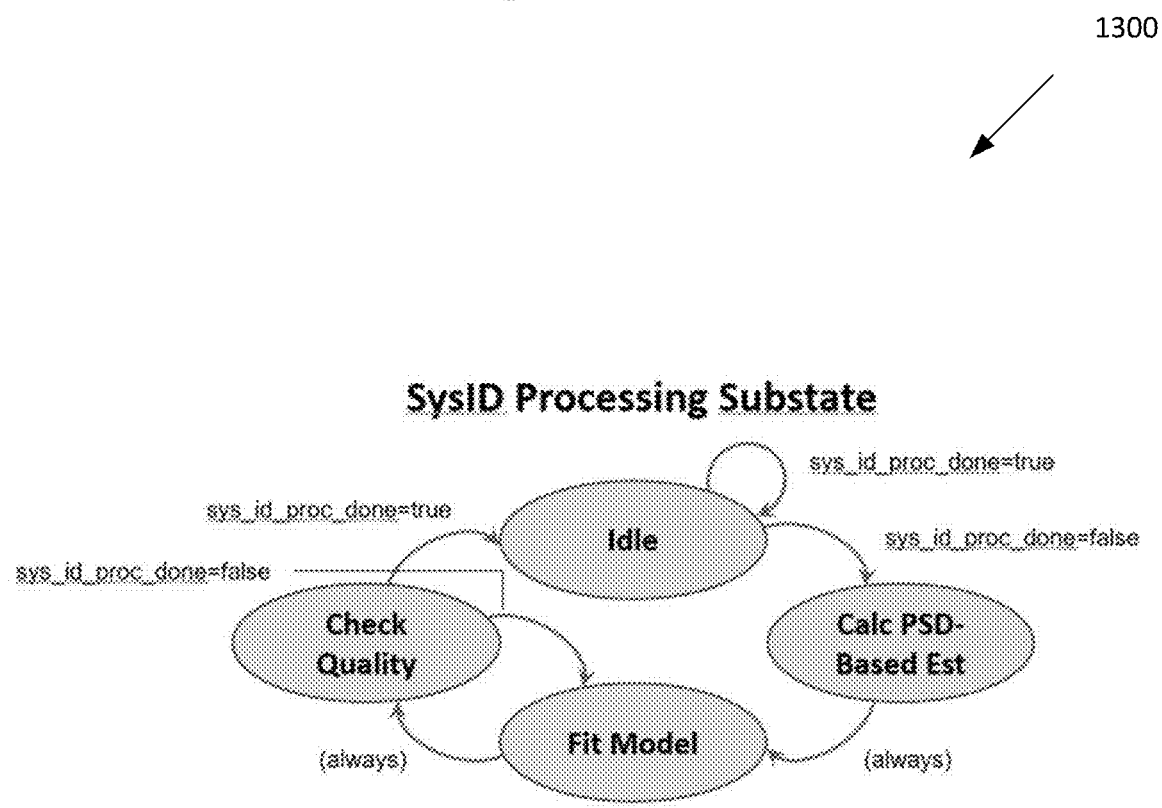
FIG. 13 is a diagram illustrating the system identification processing substate, according to an embodiment of the present invention.

A system identification state machine is implemented as a MATLAB script external to the time domain simulation. The system identification state machine drives the simulation by sitting in a loop and transitioning between states based on several criteria. See, for example, FIG. 11, which is a diagram illustrating a vertigo state 1100, according to an embodiment of the present invention. FIG. 12 is a diagram illustrate illustrating a system identification experiment substate 1200, according to an embodiment of the present invention. While in the "experiment" state, torque commands are generated, and the simulation is run using the torque time series as reaction wheel inputs. Experiment substates include white noise experiments, log chirp experiments, and linear dwell experiments. FIG. 13 is a diagram illustrating the system identification processing substate 1300, according to an embodiment of the present invention. While in the "processing" state, the model gyro output data is ingested, together with any previous model data, by the ARMAX algorithm and an updated model is obtained.

New model uncertainty curves may also be generated. The updated model and uncertainty model are used by the state machine to determine its next action. For example, the updated model and uncertainty model may generate a new input chirp signal centered at a detected mode or may terminate the experiment if a sufficiently high-quality model has been obtained. The ACS loop remains open while the wheels are being commanded with the excitation inputs because the objective is to identify the open-loop plant dynamics. In another embodiment, the system identification experiment is performed with closed-loop attitude control, where the excitation input is added to the output of a low-bandwidth controller to stabilize the space vehicle attitude during the experiment.

Simulation Results

Figure 6:
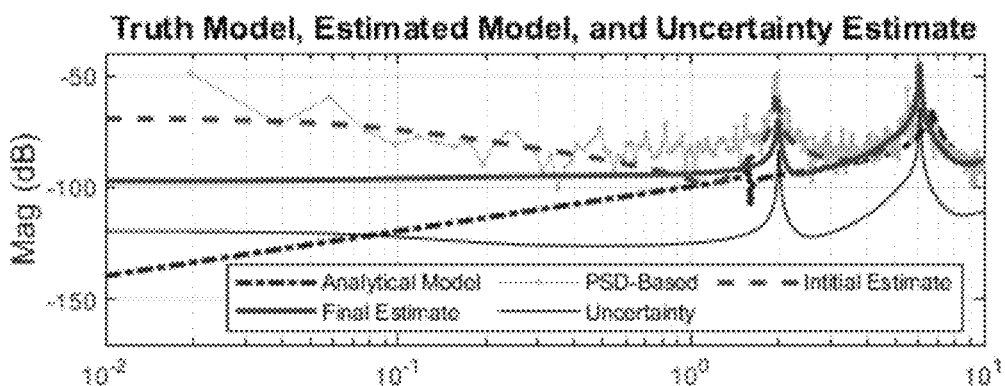
FIG. 6 are plots illustrating simulated system identification results for a satellite bus attitude control system, according to an embodiment of the present invention.
Figure 6:
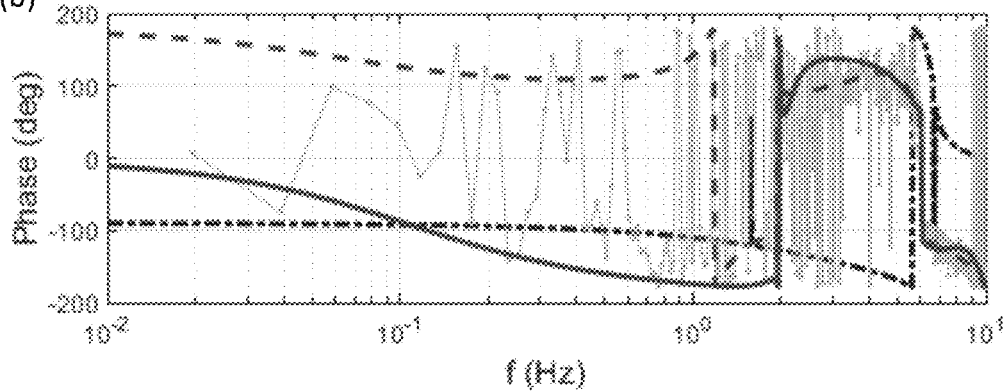

A simulation case study was performed using an ARMAX model of order $n_a=n_b=n_c=8$. FIG. 6 includes plots 600(a) and 600(b) illustrating simulated system identification results, according to an embodiment of the present invention. As shown in graphs 600(a) and 600(b) of FIG. 6, the estimated model matches well with both the linearized analytical model and an empirical transfer function estimate (ETFE) based on power spectral density estimation. Note, both the estimated model and the ETFE indicate that there are high-frequency dynamics not captured in the analytical model.

By design, the first two experiments run by the state machine use white noise and a logarithmically swept chirp as inputs, respectively. These broadband excitations help convergence of the backbone of the estimated model, with the white noise helping more at higher frequencies and the chirp at lower frequencies, but they typically leave large uncertainties near modes. Subsequently, a series of linear dwell-band chirps are computed centered at regions of high uncertainty which often correspond to modes.

Figure 7:
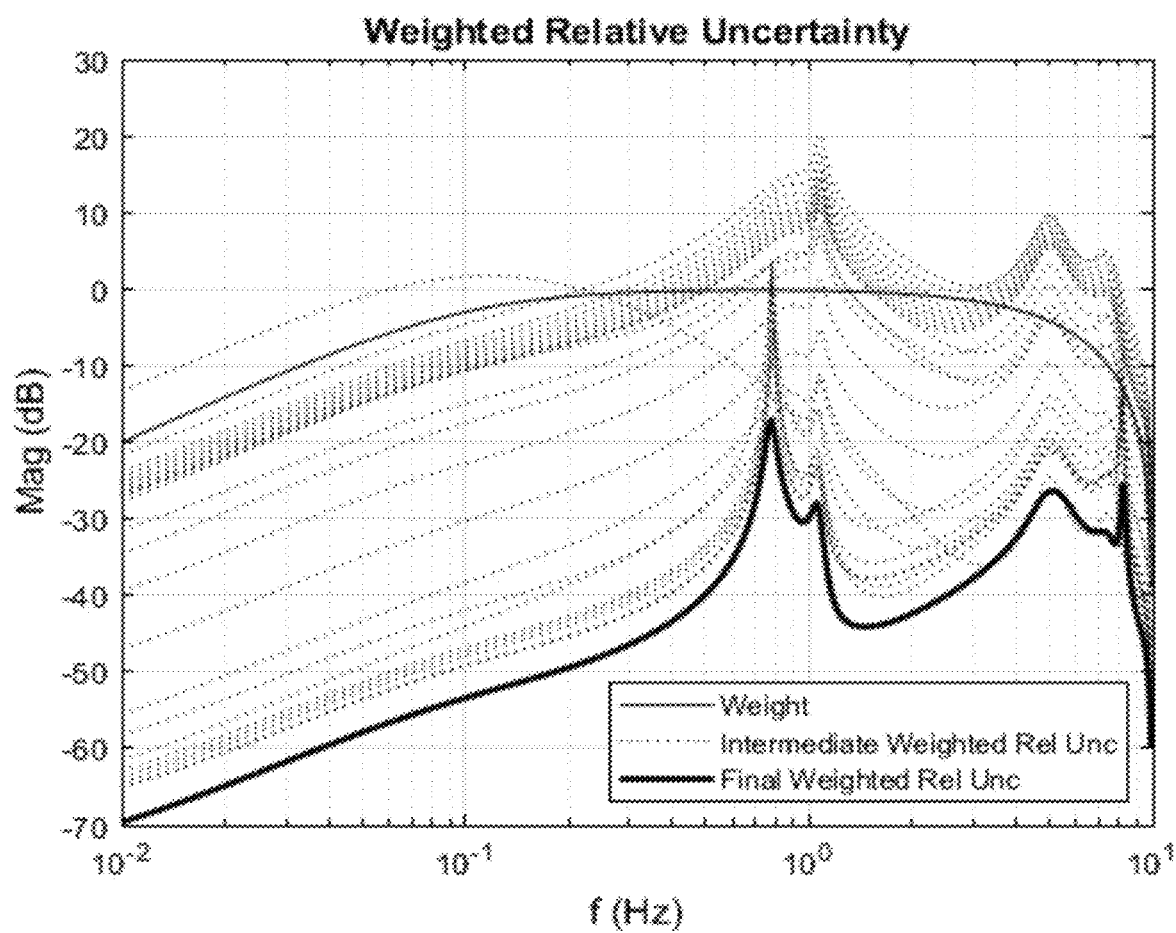
FIG. 7 is a graph illustrating simulated convergence of estimated weighted relative uncertainty for a satellite bus attitude control system, according to an embodiment of the present invention.
Figure 8:
FIG. 8 is a graph illustrating a model showing simulated convergence of prediction errors for a satellite bus attitude control system, according to an embodiment of the present invention.
Figure 8:
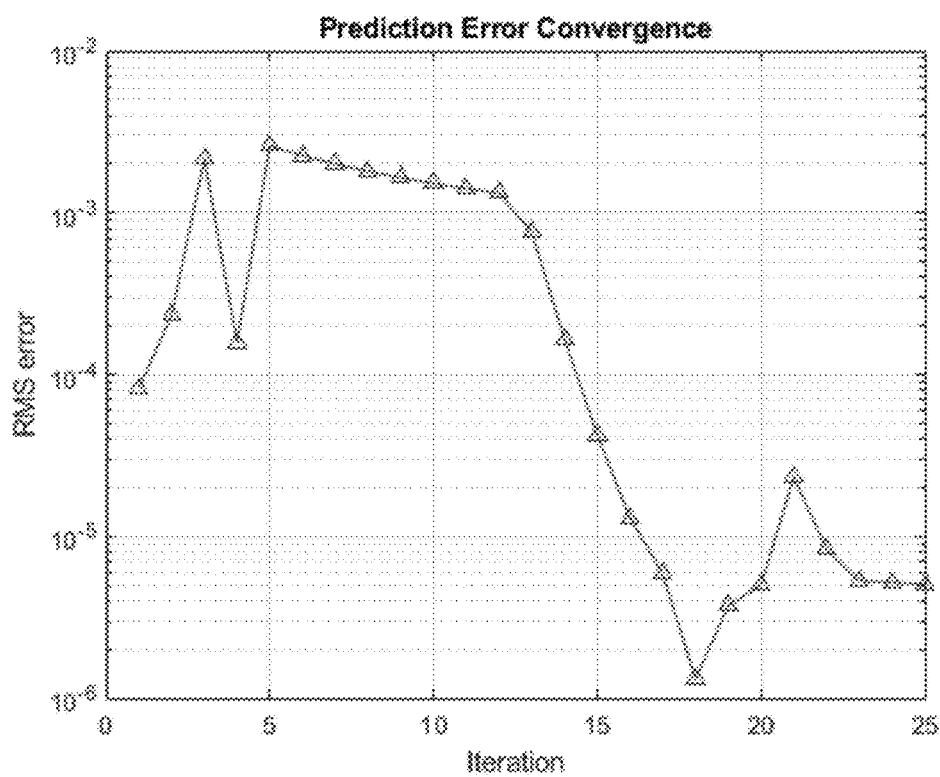

FIG. 7 is a graph 700 illustrating a model showing convergence of estimated uncertainty, according to an embodiment of the present invention. In some embodiments, graph 700 shows the reduction in weighted relative uncertainty in the frequency response. The weighting function is applied to prevent the algorithm from focusing on regions of high uncertainty in frequency bands that are not of interest. The reduction of the prediction errors, which the goal of the optimization is the minimization of prediction errors. This is shown in FIG. 8, which is a graph 800 illustrating a model showing convergence of prediction errors, according to an embodiment of the present invention. In this case, in relation to FIG. 7, the algorithm terminated when a maximum number of iterations was reached as the weighted relative uncertainty remained larger than the termination threshold of −20 dB at the 0.8 Hz anti-resonance. This uncertainty is acceptable for controller design and analysis since the loop gain is very small at that frequency.

Once an accurate model estimate has been obtained, model reduction techniques can be applied. The reduced model is then used for a host of applications such as parameter identification, control design, etc., all with a high degree of confidence.

With the state machine discussed above, below is a description of an exemplary hardware implementation.

Reaction Wheel Testbed Setup

To test the above-mentioned method, a reaction wheel testbed was constructed to mimic a free-floating satellite in one dimension and provide the ability to test the algorithms using flight-like hardware.

The test is initiated by a host machine generating a reaction wheel command profile for a single axis from the automated system identification algorithm in MATLAB. The reaction wheel profile is then uploaded by custom Python ground software to flash memory embedded on engineering hardware, accessible by a micro-controller. The board support package, peripheral drivers and other application code are written in C. Upon upload and verification of a command profile, a 20 Hz control loop is started by the ground software. During each cycle of the control loop a reaction wheel command is read from flash storage and executed, and the measured gyroscope integrated angle and wheel speed are saved. At the end of the experiment iteration, the ground software downloads the integrated angles and measured wheel speeds from flash by serial communication. The system identification algorithm ingests the downloaded data and produces the next set of reaction wheel commands to be uploaded for the next iteration. The process ends once the weighted relative uncertainty falls below a specified threshold.

Since this algorithm is intended for integration on the Vertigo payload, using the verified MATLAB code with measured sensor data is an important incremental step to the future implementation of the automated algorithms on an embedded controller. It should be appreciated that the reaction wheel testbed system identification experiments may be performed on flight-like computing systems.

Results

Figure 9:
FIG. 9 are plots illustrating system identification results for a satellite reaction wheel hardware testbed, according to an embodiment of the present invention.
Figure 9:
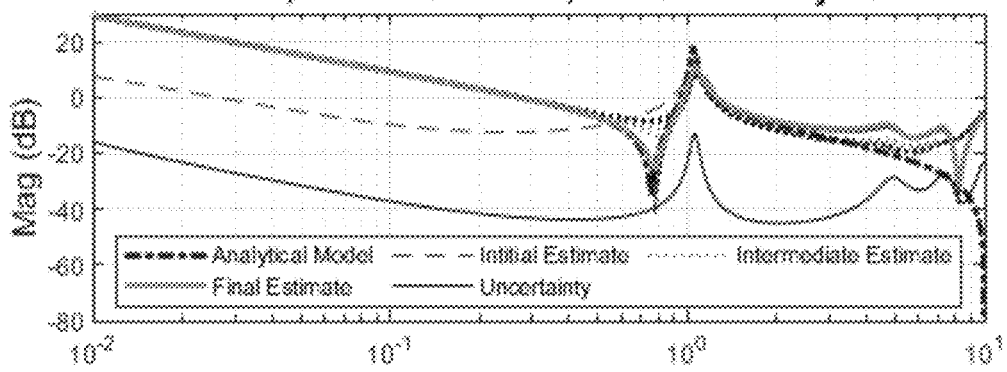
Figure 9:
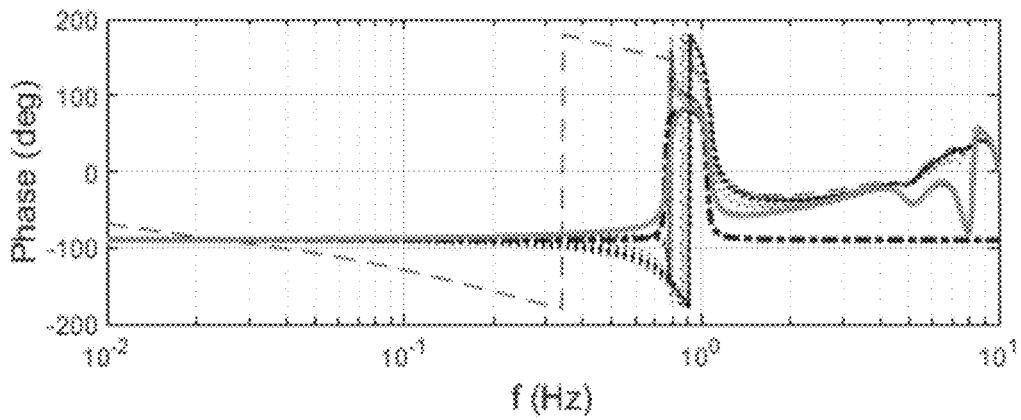
Figure 10:
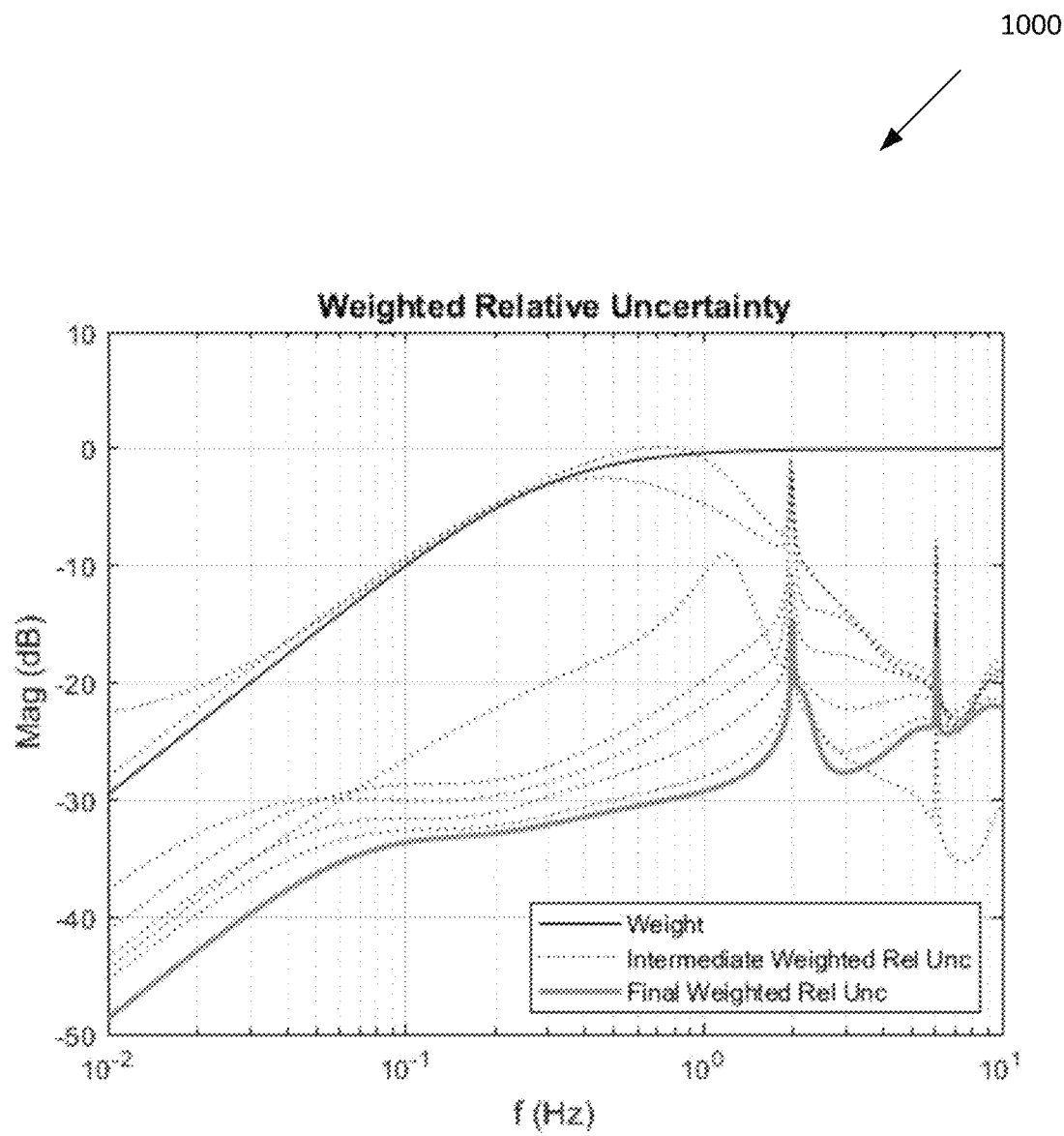
FIG. 10 is a graph illustrating convergence of estimated weighted relative uncertainty for a satellite reaction wheel hardware testbed, according to an embodiment of the present invention.

The results from applying the system identification approach to the reaction wheel testbed are shown in plots 900(*a*) and 900(*b*) of FIG. 9 and graph 1000 of FIG. 10. In this case, the analytical frequency response is based on a first-principles physics model. The estimated model contains two significant modes within 20% of the predicted frequencies. However, damping ratios are harder to predict and the identified model shows that the peaking of the modes in the analytical model was significantly underestimated. Also, whereas the model has zero DC gain and thus predicts that the wheels must accelerate to produce an angular offset, the identified model suggests that there will be a small offset for nearly constant rates. This difference could be explained, for example, by misalignments between the input and output axes. Lastly, it is noted that while the estimated model can be used in controls analyses, the phase estimates of the ETFE based on the white noise experiment are too noisy to be used.

The automated system identification method presented in this disclosure enables more efficient use of time and resources by eliminating the need for a "person-in-the-loop". By automating this process, ACS design cycle timelines and complexity are reduced, and satellites can launch more rapidly and efficiently. Both the simulation and hardware testbed demonstrated the ability to identify the targeted system using an ARMAX model and reduced the model uncertainty through tailored, automated excitation inputs.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:
1. A method, comprising:
performing a system identification experiment;
performing a system identifying processing by fitting a model to data from the system identification experiment;
performing model reduction to generate a model numerically suitable for controller synthesis by removing inconsequential states, wherein the inconsequential states cause controller optimization methods to fail;

performing control synthesis using the generated model or reduced models, including disturbance spectrum estimates, to generate a candidate controller design to be used during system operation; and checking controller robustness using the identified model to ensure stability of the system while maximizing closed-loop bandwidth and performance.

2. The method of claim 1, wherein the generated model is a parametric dynamic model from measurable inputs to measurable outputs and unknown disturbance inputs to measurable outputs.

3. The method of claim 1, wherein the generated model is a discrete-time transfer function or matrix of discrete-time transfer functions or an equivalent state space model, where orders of a transfer function numerator and denominator polynomials or a number of states are specified prior to estimating the parameters of the generated model.

4. The method of claim 1, wherein the generated model is a locally or globally optimal solution to a system identification problem of minimizing energy of prediction errors given a set of measured input data, measured output data, and a specified model structure.

5. The method of claim 1, wherein the generated model comprises estimated covariances of the estimated parameters of the generated model that are subsequently used to compute uncertainties of estimated frequency responses of the generated model, and the uncertainties of the estimated frequency response are key enablers for automating the automated system identification and control synthesis and validation processes.

6. The method of claim 1, wherein the reduced model is parametric dynamic model from measurable inputs to measurable outputs and unknown disturbance inputs to measurable outputs.

7. The method of claim 1, wherein the reduced model is a discrete-time transfer function or matrix of discrete-time transfer functions or an equivalent state space model, where orders of a transfer function numerator and denominator polynomials or a number of states are specified prior to estimating the parameters of the model.

8. The method of claim 7, wherein the reduced model is a smaller model in terms of transfer function polynomial orders or number of state space model states, produces larger prediction errors than a generated model, and is suitable for controller synthesis.

9. The method of claim 1, wherein the disturbance spectrum estimates is computed from an estimated disturbance model, the estimated disturbance model is part of a generated model.

10. The method of claim 1, wherein the performing of the system identifying processing comprises estimating uncertainty, the uncertainty comprising frequency-dependent uncertainties.

11. A method for automated system identification and controller synthesis, comprising:

continuously performing, by a computing system, a system identification experiment and system identification processing until a frequency-dependent relative uncertainty is less than a predefined threshold across one or more frequencies under consideration;

performing, by the computing system, a model reduction; and continuously performing, by the computing system, controller synthesis until a closed-loop system is robustly stable given estimated uncertainty in a model and closed-system performance metrics are maximized.

12. The method of claim 11, wherein the performing of the system identification experiment comprises generating and injecting an excitation signal, and recording a total input and output response.

13. The method of claim 11, wherein the performing of the system identification processing comprises fitting a model, and estimating the frequency-dependent relative uncertainty with the fitted model.

14. The method of claim 13, further comprising:
evaluating a quality of the fitted model using estimated frequency-dependent uncertainties.

15. The method of claim 14, further comprising:
generating, from the fit model, an estimated disturbance model; and
computing an estimated disturbance spectrum from the estimated disturbance model.

16. The method of claim 11, wherein the predefined threshold is based on a user-defined threshold based on a confidence level.

17. The method of claim 13, wherein the predefined threshold is a constant value against which a weighted relative frequency-dependent uncertainty is compared.

18. The method of claim 11, wherein the performing of the model reduction comprises
casting the fitted model into a controller or observer canonical state-space form, wherein coefficients of the fitted model are directly used as elements in select rows or columns of a state-space model matrices, and
performing the model reduction on a canonical state-space model.

19. The method of claim 18, wherein the performing of the model reduction comprises
applying the model reduction prior to any use or transformation of the canonical state-space model.

20. The method of claim 11, wherein the reduced model is a parametric dynamic model from measurable inputs to measurable outputs and unknown disturbance inputs to measurable outputs.

21. The method of claim 11, wherein the reduced model is a discrete-time transfer function, matrix of discrete-time transfer functions, or an equivalent state space model, where orders of a transfer function numerator and denominator polynomials or a number of states are specified prior to estimating the parameters of the model.

22. The method of claim 11, wherein the performing of the control synthesis comprises
creating a controller; and
performing a robustness check.

23. The method of claim 22, wherein the creating of the controller comprises creating an auto-tuned proportional-integral-derivative (PID) controller, creating a frequency-shaped linear quadratic Gaussian (LQG) controller, or synthesizing an H-infinity controller.

24. The method of claim 23, wherein the LQG controller requires multiple iterations of checking the controller robustness and resynthesizing the controller to reduce the bandwidth by adjusting the frequency-shaped weighting function until robustness is achieved.

25. The method of claim 23, wherein the H-infinity control synthesis produces a robust controller on a first attempt, though the controller synthesis process itself may internally use an iterative process.

26. The method of claim 22, wherein the performing of the robustness check comprises performing a first stability check to ensure that the closed-loop system model is stable when a generated controller is applied to an identified model.

27. The method of claim 26, wherein the performing of the first stability check comprises computing eigenvalues of the closed-loop system model to ensure the eigenvalues have magnitudes less than one.

28. The method of claim 27, further comprising:
when the identified model is uncertain, performing a stability check utilizing a reduced model.

29. The method of claim 28, further comprising:
incorporating the uncertainty model and a model reduction error is incorporated as additive complex unstructured uncertainties in a robust stability analysis based on mu-analysis theory.

30. The method of claim 29, further comprising:
checking the robustness using mu-analysis when bounds on an additive complex unstructured uncertainty is computed from the model uncertainty.

31. The method of claim 30, further comprising:
checking, using mu-analysis, a maximum singular value of a perturbed closed-loop system at each frequency in a dense grid of frequencies.

32. The method of claim 31, further comprising:
iteratively reducing performance goals until robust stability is ensured, when robust stability of the system is unensured.

* * * * *

UNITED STATES PATENT AND TRADEMARK OFFICE
CERTIFICATE OF CORRECTION

| | | |
|---|---|---|
| PATENT NO. | : 11,513,479 B1 | |
| APPLICATION NO. | : 17/409683 | |
| DATED | : November 29, 2022 | |
| INVENTOR(S) | : Daniel Joseph Hernandez et al. | |

It is certified that error appears in the above-identified patent and that said Letters Patent is hereby corrected as shown below:

On the Title Page

Please correct the third inventor's middle name in Item (72) to Evan Nathaniel Sperber.

Signed and Sealed this
Third Day of September, 2024

Katherine Kelly Vidal
*Director of the United States Patent and Trademark Office*